(12) United States Patent
Sharma et al.

(10) Patent No.: US 10,656,707 B1
(45) Date of Patent: May 19, 2020

(54) WAVEFRONT SENSING IN A HEAD MOUNTED DISPLAY

(71) Applicant: Facebook Technologies, LLC, Menlo Park, CA (US)

(72) Inventors: Robin Sharma, Redmond, WA (US); Marina Zannoli, Seattle, WA (US); Kevin James MacKenzie, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/950,017

(22) Filed: Apr. 10, 2018

(51) Int. Cl.
  *G06F 3/01* (2006.01)
  *G02B 27/01* (2006.01)
  *G02B 5/04* (2006.01)

(52) U.S. Cl.
  CPC .............. *G06F 3/013* (2013.01); *G02B 5/04* (2013.01); *G02B 27/0172* (2013.01); *G02B 27/0176* (2013.01); *G02B 2027/0178* (2013.01)

(58) Field of Classification Search
  CPC combination set(s) only.
  See application file for complete search history.

(56) References Cited

U.S. PATENT DOCUMENTS 9,921,413 B2   3/2018   Xu
2019/0179409 A1*  6/2019   Jones ................. G06F 3/013

* cited by examiner

*Primary Examiner* — Deeprose Subedi
(74) *Attorney, Agent, or Firm* — Fenwick & West LLP

(57) ABSTRACT

A head mounted display (HMD) includes an eye sensor, an optics block, and a display. The eye sensor includes a detector and a tunable lens. The tunable lens has a micro-lens state (e.g., acts as a micro-lens array) and a neutral state. In the micro-lens state the eye sensor acts as an accommodation sensor, and in the neutral state the eye sensor acts as an eye tracking sensor. The eye sensor can alternate functioning as an eye tracking or an accommodation sensor by adjusting the state of the tunable lens. In alternate embodiments, the accommodation sensor is separate from the eye tracker and a beam splitter is used to split the reflected light toward the two sensors.

15 Claims, 4 Drawing Sheets

US 10,656,707 B1

WAVEFRONT SENSING IN A HEAD MOUNTED DISPLAY

BACKGROUND

The present disclosure generally relates to enhancing images from electronic displays, and specifically to generate aberration corrected images based in part on a measured accommodation of a user's eye.

A head mounted display (HMD) can be used to simulate virtual environments. Such an HMD includes optics which may introduce aberrations into images presented to the user. Conventional HMDs are often unable to fully compensate for aberrations introduced by the headset optics when rendering content. Moreover, being able to reasonably determine where the eyes of a user accommodated is required for accurately rendering blur as a depth cue in virtual reality (VR) and augmented reality (AR) displays. Knowledge of the accommodative state of the eye is also valuable for varifocal HMDs, as well as multi-planar and volumetric displays.

Vergence and accommodation are neurally linked. In current variable-focus HMDs, the accommodation state of the eye is inferred by tracking the eyes vergence state and trying to estimate the position in depth of the user's eye gaze. This indirect estimation of the accommodative state of the eye is good enough for some applications; however, because of individual variation in prescriptions, and accommodation dynamics, this is a sub-optimal solution. For example, this requires using a derived average of response time across the population for the accommodation response, which may result in an incorrect positioning of the focal plane dynamically, incorrect blur and depth cues, and artifacts in the displays perceived quality, perceived contrast and quality.

Other multi-focal based volumetric methods for presenting stimuli provide a more natural cue to accommodation; however, these methods suffer from engineering and visual challenges. First, because the eye is receiving the sum of light energy from spatially aligned pixels, the alignment of image planes in front of the eye is critical. Secondly, because the eye is usually defocused to the image planes when viewing content, this formulation of a light-field display suffers from reduced contrast and reduced image quality. This can be rectified by adding a variable focus element to the volumetric display. However, this comes with added engineering challenges, and has yet to be proven.

Moreover, vergence-based estimates of accommodation state have yet to prove accurate enough to position an image plane for optimal sharpness.

SUMMARY

A head mounted display (HMD), in one embodiment, includes an electronic display, an optics block, and an eye sensor assembly. The electronic display emits infrared light and the eye sensor assembly includes a tunable lens and a detector configured to operate as an eye tracking system and an accommodation sensor. The tunable lens is capable of operating in a wavefront sensing state (or micro-lens state) and an eye tracking state (or neutral state) and the IR light is directed to the eye sensor assembly from the electronic display via a hot mirror. In the wavefront sensing state, the eye sensor operates as an accommodation sensor, such as a Shack-Hartmann wavefront sensor. In the neutral state, the tunable lens operates as an eye tracking sensor. In the wavefront sensing state, the eye sensor measures accommodation of a user's eye determined by the shape of crystalline lens within the eye. Since the lens of the eye cannot be easily visualized from the outside of the eye, IR light emitted from electronic display is delivered to the eye through the lens to the retina and detected after the IR light is reflected from the retina and traverses a double-pass propagation through the eye. The shape of the lens of eye distorts the IR light as it passes through the lens of the eye and this distortion causes the IR light to focus on a different portion of the detector relative to where IR light would otherwise focus had it not passed through the lens of the eye. This deviation, when aggregated across the whole lens of the eye for each lenslet, allows for determination of the wavefront and the accommodative state is readily determined from this derived wavefront.

Light being scatted and reflected within the system is a constant source of noise and, in order to accurately determine the accommodative state of the eye, it is important that only light that has passed through the lens of the eye is considered when determining the wavefront. Thus, the position of the eye is tracked in real time in order to deliver IR light to the retina or to filter light received from other sources that could not have been reflected by the retina, as determined by the eye tracking sensor. This way, only light that is reflected from the retina through the pupil of the eye is captured for post-processing.

Accordingly, the accommodation sensor and the eye tracking sensor share a common optical path and use the same detector for eye-tracking and for wavefront sensing. Since the eye's natural accommodative responses are relatively slow compared to many sensors, the eye sensor assembly can be configured to switch back and forth between eye-tracking and wavefront sensing by pulse-width modulating between these two processes. Moreover, light is always reflected back at the air-cornea interface of eye. This is always a source of background noise in retinal imaging as well as in wavefront sensing, but can be minimized by delivering semi-collimated annular beams at the air-cornea interface. This would allow for light to be focused at the retina by the lens of the eye while suppressing or perhaps even eliminating on-axis corneal reflections.

Thus, adding the ability to directly measure accommodative state, in conjunction with pupil size and the state of the eyes higher order aberrations allows for accurate positioning of a focal plane that moves with the accommodative state of the eye, as well as the ability to include anatomically correct rendered blur into the virtual scene that is derived from an understanding of the user's pupil size and ocular point spread function, in real-time.

Figure 1:
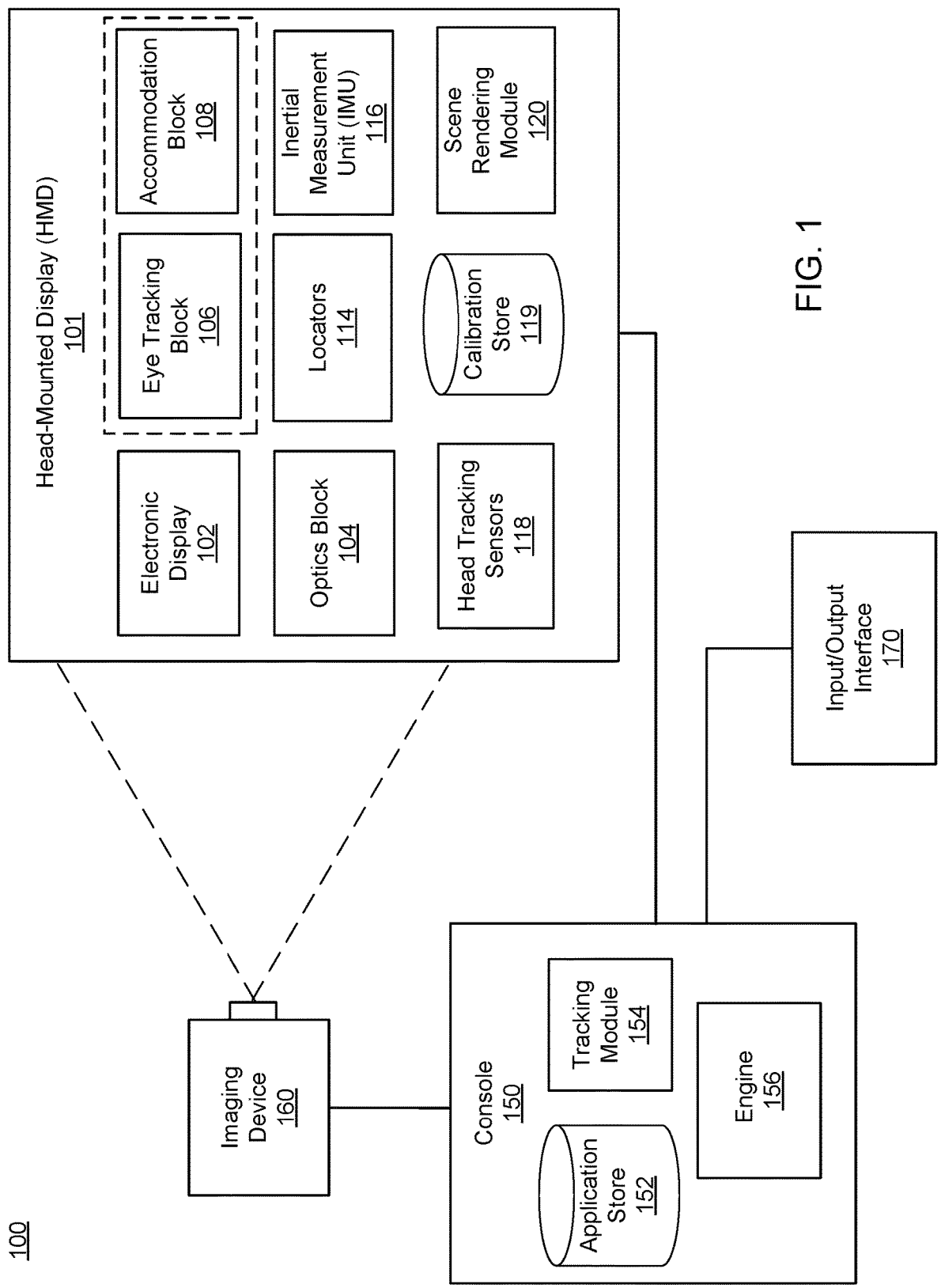
FIG. 1 shows an example system, in accordance with at least one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

Knowledge of the accommodative state of the eye allows for the rendering blur as a depth cue in virtual and augmented reality displays and is also valuable for varifocal head mounted displays (HMDs), as well as multi-planar/volumetric displays. Accordingly, systems and methods for implementing a wavefront sensor for determining the accommodative state of a user wearing a HMD are disclosed. Wavefront sensing methods include directly or indirectly tracing rays going through the pupil of the eye. While some fraction of light scatters and reflects back from the retina through the pupil, wavefront sensing methods rely on the fact that light has to initially be delivered to the retina through the pupil. In the case of a Shack-Hartmann wavefront sensor, a relay system can be used to image the pupil plane onto a lenslet array.

The accommodative state of the eye can be determined by the shape of crystalline lens buried within the eye-ball; however, this is not readily or easily visualized from the outside of the eye. Thus, in order to measure the accommodative state of the eye, light is delivered to the eye, through the lens of the eye to the retina and is detected after the light has traversed a double-pass propagation through the eye ball (e.g., passes through the eye lens, reflects off the retina, and passes through the eye lens a second time out-bound from the eye). This limits the light delivery and detection schemes.

An electronic display of the HMD, in addition to emitting light in the visible (RGB), is configured to emit light in the infrared (IR) spectrum. Since the eye is always moving, the position of the eye is tracked in real-time in order to accurately deliver light from the electronic display to the retina. This allows the HMD to only emit IR light from a portion of the electronic display at which the user is looking, thereby, directly illuminating the retina of the user's eye. In this manner, only light reflected from the retina that passes through the pupil of the eye is captured for post-processing. Moreover, the position of the eye may also allow, in another embodiment, the HMD to disregard or filter-out light being reflected or scattered from another source or object other than the retina. IR spectrum light may alternatively directed from a source separate from the electronic display based on the tracked position of the eye.

Furthermore, light is reflected back at the air-cornea interface of the eye and this is a regular source of background noise in the retinal imaging process as well as in the wavefront sensing process. In order to prevent this noise, in one embodiment, semi-collimated annular beams of light are delivered to the eye at the air-cornea interface. This allows light to be focused by the optics at the retina of the eye while suppressing or perhaps even eliminating on-axis corneal reflections. In current HMDs, the design of the eye-piece optics is to deliver collimated beams from each field point. The challenge is to generate such annular beams using the eyepiece and LED, OLED, or LCD display without additional optics. In one embodiment, annular beams can be achieved by creating Bessel beams, use large aperture VCSELs or optical vortices.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

System Overview

FIG. 1 is system 100, in accordance with at least one embodiment. In this example, the system includes an HMD 101, imaging device 160, and input/output interface 170, which are each coupled to console 150. While FIG. 1 shows a single HMD 101, a single imaging device 160, and a single input/output interface 170, in other embodiments, any number of these components may be included in the system. For example, there may be multiple HMDs 101 each having an associated input/output interface 170 and being monitored by one or more imaging devices 160, with each HMD 101, input/output interface 170, and imaging devices 160 communicating with the console 150. In alternative configurations, different and/or additional components may also be included in the system 100.

The HMD 101 is a Head-Mounted Display that presents content to a user. Example content includes images, video, audio, or some combination thereof. Audio content may be presented via a separate device (e.g., speakers and/or headphones) external to the HMD 101 that receives audio information from the HMD 101, the console 150, or both. Some embodiments of the HMD 101 have different modules than those described here. Similarly, the functions can be distributed among the modules in a different manner than is described here. In some embodiments, the HMD 101 may also act as an augmented reality (AR) and/or mixed reality (MR) headset. For example, when the HMD 101 acts as an AR headset, the HMD 101 augments views and of a physical, real-world environment with computer-generated elements (e.g., images, video, sound, etc.).

The HMD 101 includes an electronic display 102, an optics block 104, an eye tracking block 106, an accommodation block 108, one or more locators 114, an internal measurement unit (IMU) 116, a head tracking sensors 118, a calibration store 119, and a scene rendering module 120. As discussed further below with respect to FIGS. 3-5, eye tracking block 106 and accommodation block 108 can be separate blocks, modules, or systems or eye tracking block 106 and accommodation block 108 can be integrated and configured to alternatively operate as an eye tracking system and as an accommodation sensor via time-multiplexing.

The optics block 104 directs light from the electronic display 102 to an exit pupil for viewing by a user using one or more optical elements, such as apertures, Fresnel lenses, convex lenses, concave lenses, reflecting surfaces, filters, and so forth, and may include combinations of different optical elements. In some embodiments, one or more optical elements in optics block 104 may have one or more coatings, such as anti-reflective coatings. Magnification of the image light by the optics block 104 allows the electronic display 102 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

The optics block 104 may be designed to correct optical error, such as two dimensional optical errors, three dimensional optical errors, or some combination thereof. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to electronic display 102 for display is pre-distorted, and optics block 104 corrects the distortion when it receives image light from electronic display 102 generated based on the content.

In some embodiments, HMD 101 includes a varifocal actuation block that comprises a varifocal element that causes optics block 104 to vary the focal length (or optical power) of HMD 101 in order to keep the user's eyes in a zone of comfort as vergence and accommodation change. For example, a varifocal actuation block may physically changes the distance between electronic display 102 and optical block 104 by moving electronic display 102 or optical block 104 (or both). Alternatively, varifocal actuation block may change the focal length of optics block 104 by adjusting one or more properties of one or more lenses. Example properties of a lens adjusted by the varifocal actuation block include: an optical path length, an index of refraction of a lens medium, a shape of a lens, and so forth. For example, varifocal actuation block may changes the focal length of the one or more lenses using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component. Additionally, moving or translating two lenses relative to each other may also be used to change the focal length of HMD 101. Thus, varifocal actuation block may include actuators or motors that move electronic display 102 and/or optical block 104 on a track to change the distance between them or may include actuators and other components or mechanisms for changing the properties of one or more lenses included in optics block 104. A varifocal actuation block may be separate from or integrated into optics block 104 in various embodiments. HMDs including varifocal elements are further described in U.S. patent application Ser. No. 14/963,109, filed on Dec. 8, 2015, which is hereby incorporated by reference in its entirety.

Eye tracking block 106 tracks an eye position and eye movement of a user of HMD 101. A camera or other optical sensor inside HMD 101 captures image information of a user's eyes, and eye tracking block 106 uses the captured information to determine interpupillary distance, interocular distance, a three-dimensional (3D) position of each eye relative to HMD 101, including a magnitude of torsion and rotation (i.e., roll, pitch, and yaw) and gaze directions for each eye. In one example, infrared light is emitted within HMD 101 (e.g., from electronic display 102, a separate IR emitter, etc.) and reflected from each eye. The reflected light is received or detected by the camera and analyzed to extract eye rotation from changes in the infrared light reflected by each eye. Many methods for tracking the eyes of a user can be used by eye tracking block 106. Accordingly, eye tracking block 106 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, eye tracking block 106 integrates information from past measurements, measurements identifying a position of a user's head, and 3D information describing a scene presented by electronic display element 102. Thus, information for the position and orientation of the user's eyes is used to determine the gaze point in a virtual scene presented by HMD 101 where the user is looking.

Accommodation tracking module 108 tracks accommodation of one or both eyes of user of HMD 101. Accommodation is a mechanism by which the eye changes its refractive power by altering the shape of its crystalline lens to maintain a clear image or focus on an object as its distance varies from the eye. The accommodation tracking module 108 measures the accommodation of one or both of the user's eyes to generate accommodation information. The accommodation tracking module 108 may include an infrared (IR) source (e.g., a laser source, electronic display 102, etc.), a detector, and processing module. The IR source actively illuminates portions of the user's eyes. The detector captures images of the illuminated portions, and the processing module determines a shape of the crystalline lens using the captured images. The processing module then determines accommodation information using the determined shape. For example, the processing module may use a model that maps shape of a crystalline lens to respective accommodation information. In some embodiments, the accommodation tracking module 108 measures accommodation using one of multiple techniques such as the Scheiner principle, wavefront aberrometry, image quality analysis, a Badal optometer, or some combination thereof. Accommodation information describes an amount of accommodation of an eye. Accommodation information may include, e.g., an optical power of the eye, a distance from the eye at which the eye is focused, a maximum amplitude of accommodation, a range of accommodation, an estimate of the wavefront of the eye to measure changes in higher-order aberrations with changes in accommodation, or some combination thereof.

In some embodiments, the accommodation tracking module 108 determines real-time wavefront aberrations of the eye. For example, the accommodation tracking module 108 may include by a wavefront sensor, such as a Shack-Hartmann wavefront sensor, to measure the wavefront aberrations in real-time. In one embodiment, the accommodation tracking sensor is a Shack-Hartmann wavefront sensor integrated into HMD 101. A Shack-Hartmann sensor comprises an array of lenses or lenslets (or sub-aperture), each focused onto a sensor or detector (e.g., a CCD, CMOS, etc.) and, based on a focal location on the sensor, a local tilt (or deviation/difference of each beam of light from an expected focal location or centroid of the light spot) of the wavefront across each lens is calculated and the local tilts are combined to approximate a wavefront as the wavefront passes though optics block 104 and the eye lens. Thus, the deviation of the centroid of the light spot is proportional to the local wavefront derivative and the wavefront is reconstructed from the array of the centroid deviations.

The locators 114 are objects located in specific positions on the HMD 101 relative to one another and relative to a specific reference point on the HMD 101. A locator 114 may be a light emitting diode (LED), a corner cube reflector, a reflective marker, a type of light source that contrasts with an environment in which the HMD 101 operates, or some combination thereof. Active locators 114 (i.e., an LED or other type of light emitting device) may emit light in the visible band (~380 nm to 750 nm), in the infrared (IR) band (~750 nm to 14,000 nm), in the ultraviolet band (10 nm to 380 nm), some other portion of the electromagnetic spectrum, or some combination thereof. Additionally, in some embodiments, the locators 114 may include light sensors (e.g., photo-diodes, cameras, etc.)

The locators 114 can be located beneath an outer surface of the HMD 101, which is transparent to the wavelengths of light emitted or reflected by locators 114 or is thin enough not to substantially attenuate the wavelengths of light emitted or reflected by the locators 114. Further, the outer surface or other portions of the HMD 101 can be opaque in the visible band of wavelengths of light. Thus, the locators 114 may emit light in the IR band while under an outer surface of the HMD 101 that is transparent in the IR band but opaque in the visible band.

The IMU 116 is an electronic device that generates fast calibration data based on measurement signals received from one or more of the head tracking sensors 118, which generate one or more measurement signals in response to motion of the HMD 101. Examples of the head tracking sensors 118 include accelerometers, gyroscopes, magnetometers, other sensors suitable for detecting motion, correcting error associated with the IMU 116, or some combination thereof. The head tracking sensors 118 may be located external to the IMU 116, internal to the IMU 116, or some combination thereof.

Based on the measurement signals from the head tracking sensors 118, the IMU 116 generates fast calibration data indicating an estimated position of the HMD 101 relative to an initial position of the HMD 101. For example, the head tracking sensors 118 include multiple accelerometers to measure translational motion (forward/back, up/down, left/right) and multiple gyroscopes to measure rotational motion (e.g., pitch, yaw, roll). The IMU 116 can, for example, rapidly sample the measurement signals and calculate the estimated position of the HMD 101 from the sampled data. For example, the IMU 116 integrates measurement signals received from the accelerometers over time to estimate a velocity vector and integrates the velocity vector over time to determine an estimated position of a reference point on the HMD 101. The reference point is a point that may be used to describe the position of the HMD 101. While the reference point may generally be defined as a point in space, in various embodiments, reference point is defined as a point within the HMD 101 (e.g., a center of the IMU 130). Alternatively, the IMU 116 provides the sampled measurement signals to the console 150, which determines the fast calibration data.

The IMU 116 can additionally receive one or more calibration parameters from the console 150. As further discussed below, the one or more calibration parameters are used to maintain tracking of the HMD 101. Based on a received calibration parameter, the IMU 116 may adjust one or more IMU parameters (e.g., sample rate). In some embodiments, certain calibration parameters cause the IMU 116 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The calibration store 119, in one embodiment, is a data store that maintains calibration information. Calibration information is information that maps optical aberration information (also referred to as aberration information) to specific amounts of eye accommodation (and potentially pupil size) for a user of particular demographic profile, user profile including information specific to a user (e.g., measured using a separate calibration device (e.g., a wavefront aberrometer)), or some combination thereof. Optical aberration information may describe, e.g., barrel distortion, pincushion distortion, longitudinal chromatic aberration, transverse chromatic aberration, any other type of two-dimensional optical error, spherical aberration, comatic aberration, field curvature, astigmatism, any other type of three-dimensional optical error, or some combination thereof. The optical aberration information may be specific to the optics block 104, specific to optics of a user's eye (e.g., shape of the cornea), or it may describe the total optical error caused by both the optics block 104 and the optics of the user's eye. Demographic profile information is information that describes a use's physical attributes that may affect their vision. Demographic profile information may include, e.g., age, race, ethnicity, obesity, eye prescription, diabetic, some other attribute that describe their vision, or some combination thereof. In addition to the demographic profile, calibration information may include data measured and/or stored for an individual user, representing characteristics (such as spherical aberration) for which there is wide variation from person to person, and this data may include a user's prescription for optical correction as well, allowing the device to be used without needing spectacles or contact lenses.

The scene rendering module 120 receives content for the virtual scene from the engine 156 and provides the content for display on the electronic display 102. Additionally, the scene rendering module 120 can adjust the content based on information from the eye tracking block 106, accommodation tracking module 108, the calibration store 119, the IMU 116, varifocal actuation block, and the head tracking sensors 118. For example, upon receiving the content from the engine 156, the scene rendering module 120 may adjust the content by adding a pre-distortion into rendering of the virtual scene to compensate or correct for the distortion caused by the optics block 104 and/or eyes of the user. Based on the aberration information, the rendering module 120, in another embodiment, may determine a focal position for the varifocal actuation block and a pre-distortion to apply to the image for rendering. The scene rendering module 120 then instructs the varifocal actuation block to adjust focus to the determined focal position, and provides the electronic display 102 the pre-distorted image for rendering. Moreover, the scene rendering module 120 uses information from the eye tracking block 106 and/or the accommodation tracking module 108 to add anatomically correct synthetically rendered blur derived from an understanding of the user's pupil size and/or ocular point spread function, in real-time.

The virtual scene, in one embodiment, is rendered to produce an aberration-adjusted image that, once displayed, passes through the optics of the HMD 101 and the user's eye, the image that lands on the retina is as close as possible to that which would have landed on the retina if the user were viewing an actual scene in a given accommodative state (including the effects of aberrations from defocus, which contain cues to accommodation) rather than a rendered image of one. In some embodiments, the scene rendering module 120 first renders (in memory) the virtual scene to approximate the image which would actually land on the retina in a real scene with the current accommodation state and pupil size by incorporating the estimated aberrations (determined from the aberration information) of the eye into the rendering process. The scene rendering module 120 simulates aberrations such as distortion, lateral and/or longitudinal aberration as the scene is being rendered. Once this desired retinal image has been produced, the scene rendering module 120 performs an optimization step to generate a corresponding aberration-adjusted image which is presented by the electronic display 102, so that when the aberration-adjusted image passes through the optics block 104 and the user's eye, a retinal image is as close to the desired retinal image as possible.

The imaging device 160 generates slow calibration data in accordance with calibration parameters received from the console 150. Slow calibration data includes one or more images showing observed positions of the locators 114 that are detectable by the imaging device 160. The imaging device 160 may include one or more cameras, one or more video cameras, other devices capable of capturing images including one or more the locators 114, or some combination thereof. Additionally, the imaging device 160 may include one or more filters (e.g., for increasing signal to noise ratio). The imaging device 160 is configured to detect light emitted or reflected from the locators 114 in a field of view of the imaging device 160. In embodiments where the locators 114 include passive elements (e.g., a retroreflector), the imaging device 160 may include a light source that illuminates some or all of the locators 114, which retro-reflect the light towards the light source in the imaging device 160. Slow calibration data is communicated from the imaging device 160 to the console 150, and the imaging device 160 receives one or more calibration parameters from the console 150 to adjust one or more imaging parameters (e.g., focal length, focus, frame rate, ISO, sensor temperature, shutter speed, aperture, etc.).

The input/output interface 170 is a device that allows a user to send action requests to the console 150. An action request is a request to perform a particular action. For example, an action request may be to start or end an application or to perform a particular action within the application. The input/output interface 170 may include one or more input devices. Example input devices include a keyboard, a mouse, a game controller, or any other suitable device for receiving action requests and communicating the received action requests to the console 150. An action request received by the input/output interface 170 is communicated to the console 150, which performs an action corresponding to the action request. In some embodiments, the input/output interface 170 may provide haptic feedback to the user in accordance with instructions received from the console 150. For example, haptic feedback is provided by the input/output interface 170 when an action request is received, or the console 150 communicates instructions to the input/output interface 170 causing the input/output interface 170 to generate haptic feedback when the console 150 performs an action.

The console 150 provides content to the HMD 101 for presentation to the user in accordance with information received from the imaging device 160, the HMD 101, or the input/output interface 170. In the example shown in FIG. 1, the console 150 includes the application store 152, the tracking module 154, and the engine 156. Some embodiments of the console 150 have different or additional modules than those described in conjunction with FIG. 1. Similarly, the functions further described below may be distributed among components of the console 150 in a different manner than is described here.

The application store 152 stores one or more applications for execution by the console 150. An application is a group of instructions, that when executed by a processor, generates content for presentation to the user. Content generated by an application may be in response to inputs received from the user via movement of the HMD 101 or the input/output interface 170. Examples of applications include gaming applications, conferencing applications, video playback application, or other suitable applications.

The tracking module 154 calibrates the system using one or more calibration parameters and may adjust one or more calibration parameters to reduce error in determining position of the HMD 101. For example, the tracking module 154 adjusts the focus of the imaging device 160 to obtain a more accurate position for observed the locators 114 on the HMD 101. Moreover, calibration performed by the tracking module 154 also accounts for information received from the IMU 116. Additionally, if tracking of the HMD 101 is lost (e.g., the imaging device 160 loses line of sight of at least a threshold number of the locators 114), the tracking module 154 re-calibrates some or all of the system 100 components.

Additionally, the tracking module 154 tracks the movement of the HMD 101 using slow calibration information from the imaging device 160 and determines positions of a reference point on the HMD 101 using observed locators from the slow calibration information and a model of the HMD 101. Tracking module 154 also determines positions of the reference point on the HMD 101 using position information from the fast calibration information from the IMU 116 on the HMD 101. Additionally, the tracking module 154 may use portions of the fast calibration information, the slow calibration information, or some combination thereof, to predict a future location of the HMD 101, which is provided to the engine 156.

The engine 156 executes applications within the system 100 and receives position information, acceleration information, velocity information, predicted future positions, or some combination thereof for the HMD 101 from the tracking module 154. Based on the received information, the engine 156 determines content to provide to the HMD 101 for presentation to the user, such as a virtual scene. For example, if the received information indicates that the user has looked to the left, the engine 156 generates content for the HMD 101 that mirrors or tracks the user's movement in a virtual environment. Additionally, the engine 156 performs an action within an application executing on console 150 in response to an action request received from the input/output interface 170 and provides feedback to the user that the action was performed. The provided feedback may be visual or audible feedback via the HMD 101 or haptic feedback via the input/output interface 170.

Figure 2:
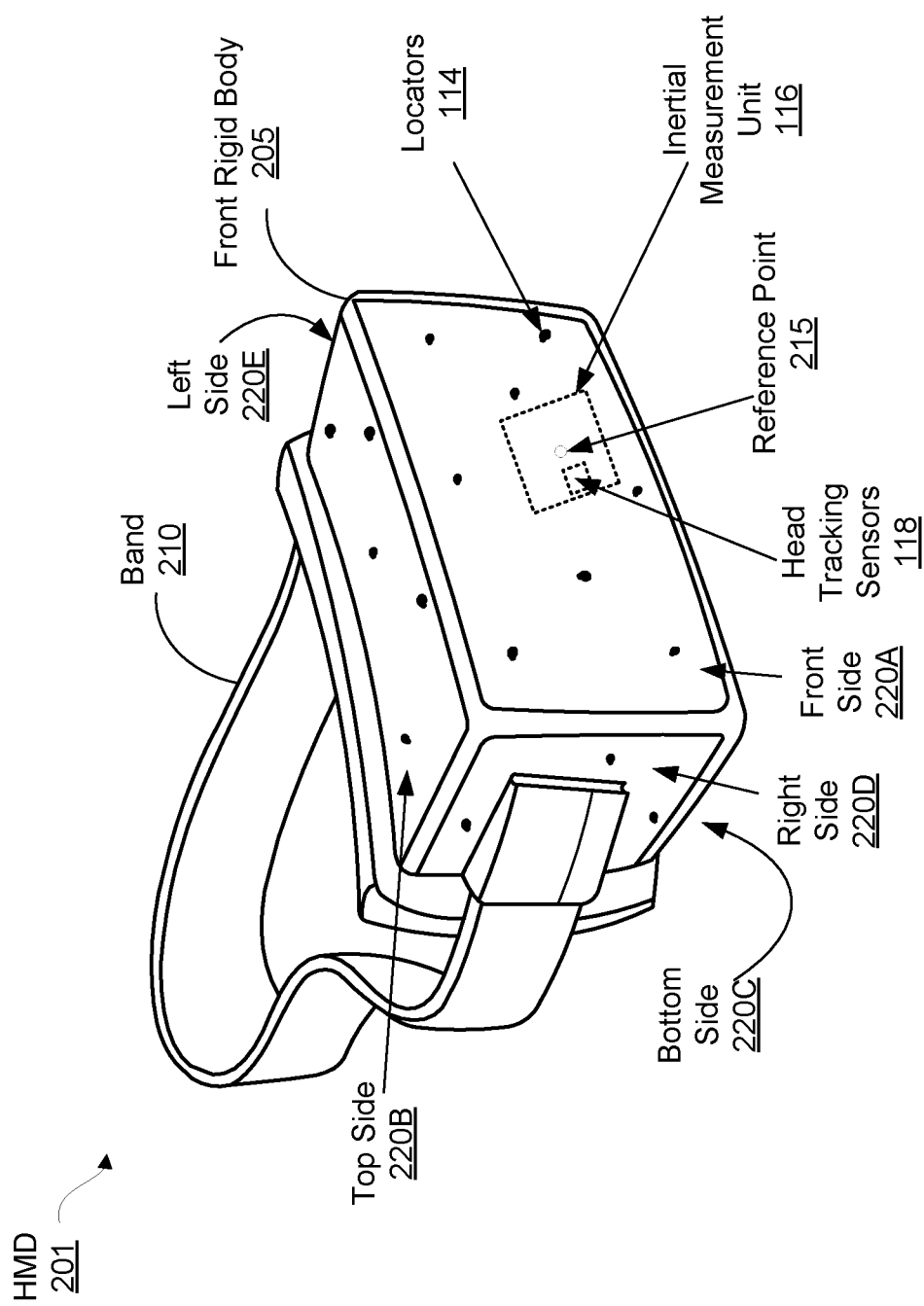
FIG. 2 is a diagram of a head-mounted display, in accordance with an embodiment.

FIG. 2 is a wire diagram of a HMD 201, in accordance with an embodiment. The HMD 200 is an embodiment of the HMD 101, and includes a front rigid body 205 and a band 210. The front rigid body 205 includes one or more electronic display elements of the electronic display 102 (not shown), the IMU 116, and the locators 114. The locators 114 are located in fixed positions on the front rigid body 205 relative to one another and relative to a reference point 215. In the example of FIG. 2, the reference point 215 is located at the center of the IMU 116. Each of the locators 114 emit light that is detectable by the imaging device 160. Locators 114, or portions of locators 114, are located on a front side 220A, a top side 220B, a bottom side 220C, a right side 220D, and a left side 220E of the front rigid body 205.

Integrated Eye Tracking and Accommodation Sensor

Figure 3A:
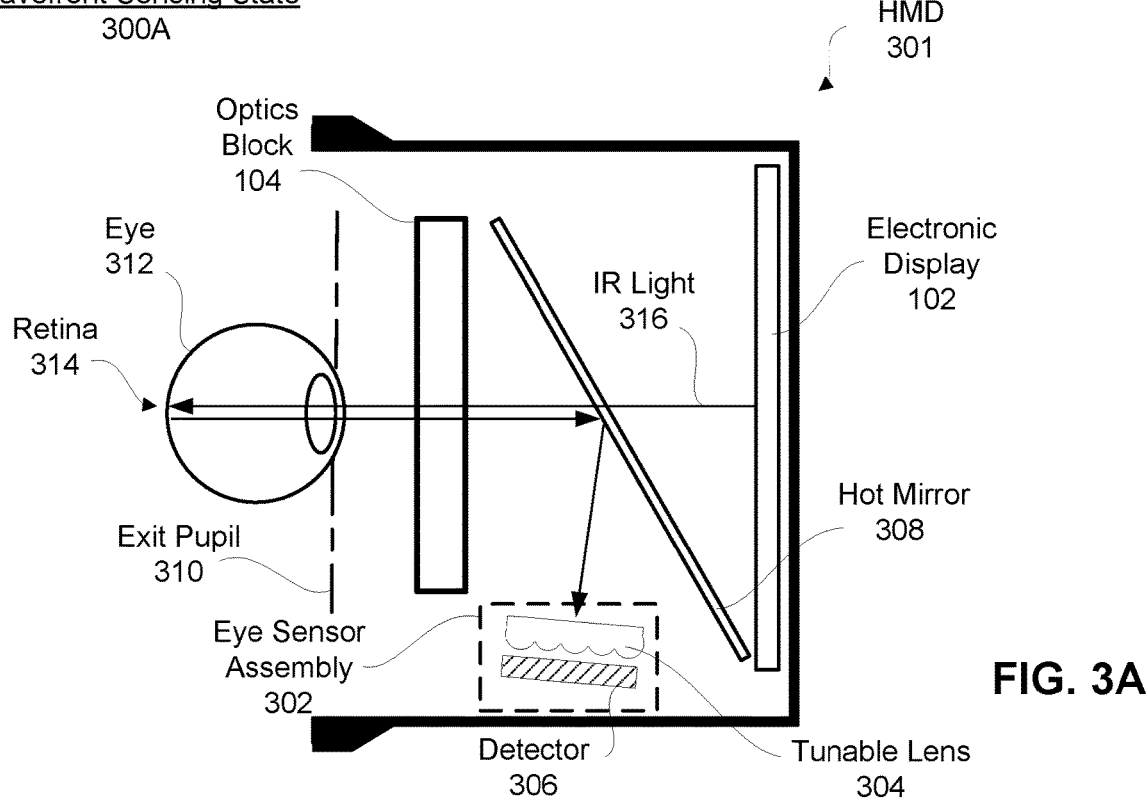
FIG. 3A is a cross-section view of a head-mounted display that includes tunable lens operating in a wavefront sensing state, in accordance with an embodiment.
Figure 3B:
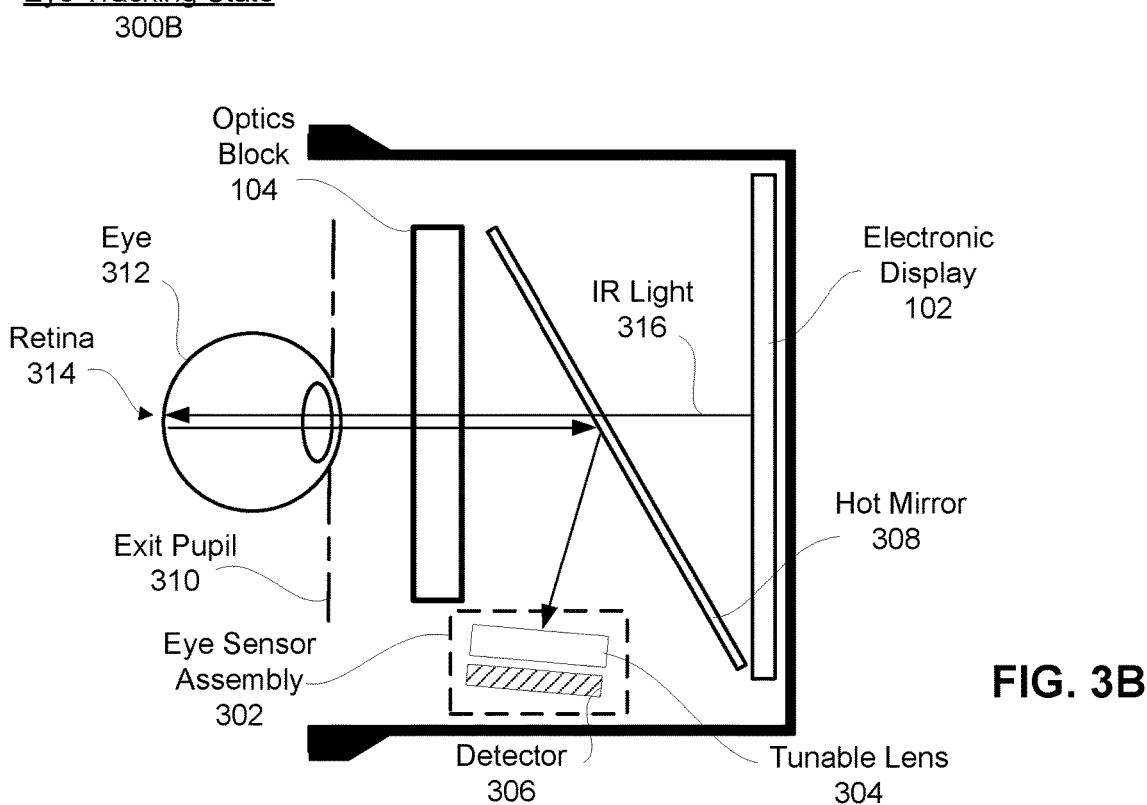
FIG. 3B is a cross-section view of the head-mounted display of FIG. 3A with the tunable lens operating in an eye tracking state, in accordance with an embodiment.

FIGS. 3A and 3B show a cross section of HMD 301 that is an embodiment of the HMD 201 shown in FIG. 2. In FIGS. 3A and 3B, HMD 301 include an electronic display element 102, an optics block 104, and an eye sensor assembly 302. In this example, the electronic display element 102 emits infrared light 316 (e.g., RGBI display with infrared pixels at 940 nm) to retina 314 of eye 312 through optics block 104. The eye sensor assembly 302, in this embodiment, includes tunable lens 304 and detector 306 that are configured to operate as an eye tracking system and an accommodation sensor. The tunable lens 304 is capable of operating in a wavefront sensing state (or micro-lens state) and an eye tracking state (or neutral state) and the IR light 316 is directed to eye sensor assembly 302 via hot mirror 308 (e.g., a dichotic element capable of reflecting IR light while transmitting visible light).

FIG. 3A shows tunable lens 304 operating in a wavefront sensing state 300A. In the wavefront sensing state 300A or micro-lens state, the eye sensor 302 operates as an accommodation sensor, such as a Shack-Hartmann wavefront sensor, and the tunable lens 304 is an array of lenslets, as shown in FIG. 3A. In the neutral state, the tunable lens 304 operates as a normal lens, such as a positive lens, and the eye sensor 302 operates as an eye tracking sensor. In the micro-lens state, the eye sensor 302 measures accommodation of a user's eye 312. The accommodative state of the eye 312 is determined by the shape of crystalline lens buried within the eye 312. Since the lens of eye 312 cannot be easily visualized from the outside of the eye 312, IR light 316 emitted from electronic display 102, in this embodiment, is delivered to the eye 312 through the lens of the eye to the retina 314 and detected after the IR light 316 is reflected from the retina 314 and traverses a double-pass propagation through the eye 312. The shape of the lens of eye 312 distorts the IR light as it passes through the lens of the eye 312. This distortion causes the IR light 316 to focus on a different portion of the detector 306 relative to where IR light 316 would otherwise focus had it not passed through the lens of the eye 312. This deviation, when aggregated across the whole lens of the eye 312 (since the deviation will be different across different portions of the eye) for each lenslet (where each lenslet receives a different portion of the IR light 312 reflected from a different portion of retina 314), allows a wavefront for the IR light 312 to be determined (or approximated) and the accommodative state of the eye 312 is readily determined from the wavefront. In one embodiment, the tunable lens 304 is a CMOS tunable liquid lens.

FIG. 3B shows tunable lens 304 operating in an eye tracking state 300A. Light being scattered and reflected within the system is a constant source of noise and, in order to accurately determine the accommodative state of the eye 312, it is important that only light that has passed through the lens of the eye 312 is considered when determining the wavefront. Thus, the position of the eye 312 is tracked in real time in order to at least one of 1) only deliver IR light 316 to the retina 314 (so that a majority of the light must have been reflected off the retina 314) or 2) to filter out (i.e., remove from consideration) light received from other sources (e.g., source angles) by detector 306 that could not have been reflected by the retina 314, as determined by the eye tracking sensor. This way, only light that is reflected from the retina through the pupil of the eye 312 is captured for post-processing.

In one embodiment, electronic display 102 is configured to emit the IR light 316 from only a portion (or subset) of the electronic display 102 that is capable of reaching the retina 314 (e.g., while not emitting IR light from other portions of electronic display 102 that could not reach the retina, as determined by eye tracking) with the IR light 316 to minimize scattering and reflections. In an alternative embodiment, the IR light 316 source is a tunable IR laser configured to direct a beam of the IR light 316 to retina 314 based on eye tracking information received from eye sensor assembly 302.

Accordingly, the eye tracking sensor and the wavefront sensor in FIGS. 3A-3B share a common optical path and use the same detector for eye-tracking and for wavefront sensing. Most eye-tracking cameras or sensors operate at fast rates (e.g., >100 frames per second). Since the eye's natural accommodative responses are relatively slow, micro-fluctuations in accommodation can be adequately tracked at, for example, 15 frames per second. Consequently, eye sensor assembly 302 can be configured to switch back and forth between eye-tracking and wavefront sensing by pulse-width modulating between these two processes. For example, if the eye tracking sensor is operating at 150 frames per second, then every 8-12 frames can be dedicated to accommodation tracking.

Moreover, light is always reflected back at the air-cornea interface of eye 312. This is always a source of background noise in retinal imaging as well as in wavefront sensing. One solution around this is to deliver semi-collimated annular beams at the air-cornea interface. This would allow for light to be focused at the retina 314 by the lens of the eye 312 while suppressing or perhaps even eliminating on-axis corneal reflections. Conventional virtual reality headsets, however, design the eye-piece optics to instead deliver collimated beams of light from each field point. The challenge, however, is to generate annular beams using an optics block, such as optics block 104, and an LED, OLED, or LCD display without additional optics. One solution is to generate Bessel beams or to use large aperture VCSELs or make use of optical vortices.

The optics block 104 alters (e.g., magnifies) the received light and provides it to an exit pupil 310 for presentation to the user. Additionally, a focal length and/or back focal length spacing of the optics block 104 may be varied by the varifocal actuation block (not shown for simplicity) based on the accommodative state of eye 312. For example, the varifocal actuation block may adjust one or more optical elements within the optics block 104 to affect the focal length of the optics block 104. The adjusted focal length may additionally help mitigate optical aberrations introduced by one or more optical elements of optics block 104. In addition, the optics block 104 may be further adjusted to reduce or eliminate the need for prescription correction for users who might otherwise need to wear spectacles or contact lenses in the system. In some embodiments, the optics block 104 is designed to preserve the aberrations of the human eye (e.g. longitudinal chromatic aberration, which defocuses in some colors in traditional displays). This can be accomplished via techniques such as diffractive optics, through inducing an optical depth offset for each separate color channel across the display, by otherwise designing the optical system to place the image in focus on the retina across key wavelengths (e.g. the peaks of the display primaries), or some combination thereof. Accordingly, the pixel array may be imaged onto the retina with minimal aberration, allowing for more precise generation and control of image quality and cues such as accommodation to the visual system.

Separate Eye Tracking and Accommodation Sensor

Figure 4:
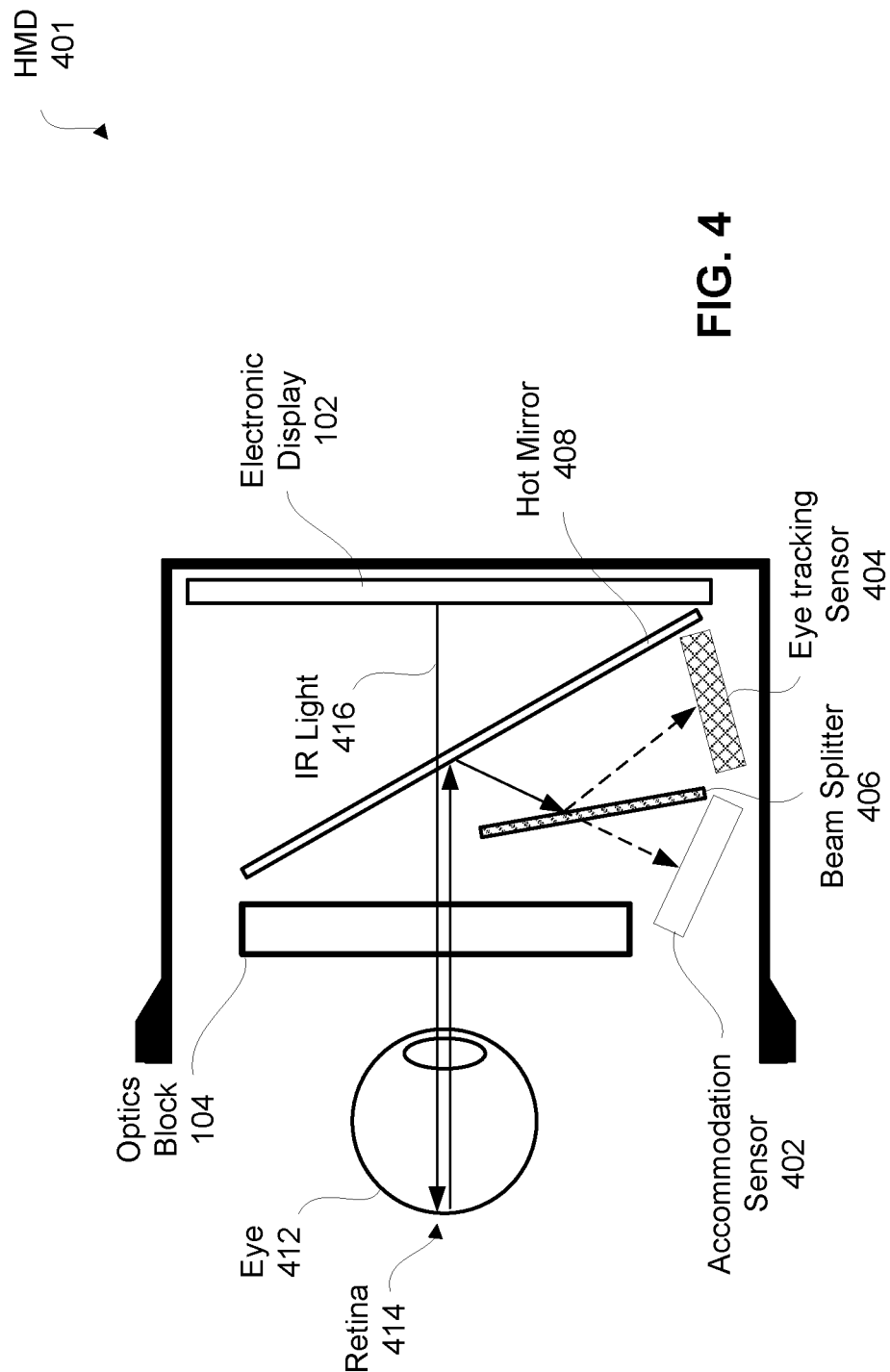
FIG. 4 is a cross-section view of a head-mounted display with a separate accommodation sensor and eye tracking sensor, in accordance with an embodiment.

FIG. 4 show a cross section of HMD 401 that is an embodiment of the HMD 201 shown in FIG. 2. HMD 401, in this embodiment, includes an electronic display element 102, an optics block 104, an accommodation sensor 402, an eye tracking sensor 404, a hot mirror 408, and a beam splitter 406. In this example, the electronic display element 102 emits infrared light 416 (e.g., RGBI display with infrared pixels at 940 nm) to retina 414 of eye 412 through optics block 104. In contrast to the embodiment described with respect to FIGS. 3A-3B, the accommodation sensor 402 and eye tracking sensor 404 are separate. IR light 416 from electronic display 102 is simultaneously directed to both the accommodation sensor 402 and eye tracking sensor 404 via beam splitter 406, which reflects a portion of the IR light 416 to eye tracking sensor 404 while transmitting a portion of the IR light 416 to the accommodation sensor.

As above, the accommodation sensor 402 is an aberrometer or wavefront sensor, such as a Shack-Hartmann wavefront sensor, that includes an array of lenslets. The accommodative state of the eye 412 is again determined by the shape of crystalline lens buried within the eye 412, thus, IR light 416 is emitted from electronic display 102 and delivered to the eye 412 through the lens to the retina 414 and detected after the IR light 416 is reflected from the retina 414 by the accommodation sensor 402. Beam splitter 406 directs another portion of the light to eye tracking sensor 404. Again, light being scatted and reflected within the system is a source of noise and, in order to accurately determine the accommodative state of the eye 412, only light that has passed through the lens of the eye 412 is sought for consideration when determining the wavefront. Thus, the position of the eye 412 is tracked in real time by eye tracking sensor 404 in order to only deliver IR light 416 to the retina 414 (by steering the IR light 416 at the pupil and/or retina) or to filter out light received from other sources (or unexpected angles) by accommodation sensor 402 that could not have been reflected by the retina 414, as determined by the eye tracking sensor. This way, only light that is reflected from the retina through the pupil of the eye 412 is captured for post-processing.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) comprising:
   at least one processor;
   an electronic display that:
      displays a virtual scene to a user wearing the HMD, and
      emits infrared (IR) light from a subset of pixels of the electronic display to deliver the IR light to a retina of an eye of the user;
   an optics block that directs light from the electronic display to an exit pupil of the HMD;
   an eye sensor including a tunable lens and a detector, the tunable lens alternates operation between a micro-lens state and a neutral state, in the micro-lens state, the eye sensor operates as a Shack-Hartmann wavefront sensor to determine a wavefront of the IR light after having passed through the eye of the user and, in the neutral state, the eye sensor operates as an eye tracking sensor; and
   memory including instructions that, when executed by the at least one processor, cause the at least one processor to:
      determine, at a first time, an eye position for the eye of the user for a frame of the virtual scene based on the IR light emitted from the electronic display being reflected from the eye of the user and received by the eye sensor with the tunable lens in the neutral state;

determine, at a second time, the wavefront of the IR light after the IR light passes through the crystalline lens of the eye of the user for the frame of the virtual scene based on the IR light emitted from the electronic display being reflected from the retina of the eye of the user and received by the eye sensor with the tunable lens in micro-lens state;

determine, for the frame of the virtual scene, a focus state for the optics block based on the wavefront of the IR light after the IR light passes through the crystalline lens of the eye of the user; and display, based on the determined focus state, the frame of the virtual scene on the electronic display to the user wearing the HMD.

2. The HMD of claim 1, wherein the optics block includes a hot mirror configured to redirect at least a portion of the IR light reflected from the retina of the eye of the user to the eye sensor.

3. The HMD of claim 1, wherein the state of the tunable lens is time-multiplexed between the micro-lens state and the neutral state.

4. The HMD of claim 1, wherein the IR light has an annular beam profile or is Bessel beam IR light.

5. The HMD of claim 4, wherein the annular beam profile of the IR light or the Bessel beam IR light is generated using a vertical-cavity surface-emitting laser (VCSEL) in the electronic display.

6. The HMD of claim 1, wherein the tunable lens in micro-lens state includes a plurality of micro-lenses, each micro-lens:

receiving a portion of the IR light reflected from a different portion of the retina; and focusing the portion of the IR light to a focal location on the detector.

7. The HMD of claim 6, wherein determining the wavefront in micro-lens state includes:

determining, for each micro-lens, differences between each focal location of the focused portion of the IR light and an expected focal location for each portion of the IR light across the tunable lens;

aggregating the differences between each focal location of the focused portion of the IR light and the expected focal location for each portion of the IR light across the tunable lens; and determining the wavefront of the IR light after having passed through the eye based on the aggregated differences across the tunable lens.

8. The HMD of claim 1, wherein the determined focus state includes at least one of synthetic blur or pre-distortion, the synthetic blur added to the virtual scene based on the shape of the crystalline lens of each eye and the pre-distortion correcting one or more optical aberrations associated with at least one of the eye of the user or the optics block.

9. A head mounted display (HMD) comprising:

at least one processor;

an electronic display that displays a virtual scene to a user wearing the HMD while emitting infrared (IR) light from a subset of the electronic display to deliver the IR light to a retina of an eye of the user;

an optics block configured to direct light from the electronic display to an exit pupil of the HMD; and an eye sensor including a tunable lens and a detector multiplexing between:

1) a micro-lens state where the eye tracking sensor operates as an accommodation sensor to determine accommodation information for the user, wherein each micro-lens receives a different portion of the IR light reflected from a different portion of the retina and focuses the different portion of the IR light to a known focal location on the detector; and 2) a neutral state where the eye sensor operates as an eye tracking sensor;

memory including instructions that, when executed by the at least one processor, cause the at least one processor to:

at a first time, determine, for each micro-lens, differences between each focal location of the focused portion of the IR light and an expected focal location for each portion of the IR light across the tunable lens;

aggregate the differences between each focal location of the focused portion of the IR light and the expected focal location for each portion of the IR light across the tunable lens; and determine the wavefront of the IR light after having passed through the eye based on the aggregated differences across the tunable lens; and track, at a second time, a position of the eye of the user.

10. The HMD of claim 9, wherein the memory including the instructions that, when executed by the at least one processor, further cause the at least one processor to:

determine accommodation information for the eye of the user based on the determined wavefront;

determine a focus state for the optics block based on the accommodation information; and display, based on the determined focus state, the virtual scene on the electronic display to the user wearing the HMD.

11. The HMD of claim 10, wherein the determined focus state includes at least one of synthetic blur or pre-distortion, the synthetic blur added to the virtual scene based on the accommodation information and the pre-distortion correcting one or more optical aberrations associated with at least one of the eye of the user or the optics block.

12. The HMD of claim 9, wherein the optics block includes a hot mirror configured to redirect at least a portion of the IR light reflected from the retina of the eye of the user to the eye sensor.

13. The HMD of claim 9, wherein the IR light has an annular beam profile or is Bessel beam IR light.

14. The HMD of claim 1, wherein the subset of pixels of the electronic display that deliver the IR light to the retina of the eye of the user is determined based on a portion of the electronic display that corresponds to where the user is looking in order to deliver the IR light to the retina.

15. The HMD of claim 9, wherein the subset of pixels of the electronic display that deliver the IR light to the retina of the eye of the user is determined based on a portion of the electronic display that corresponds to where the user is looking in order to deliver the IR light to the retina.

* * * * *